(12) United States Patent
Schaeffer et al.

(10) Patent No.: US 8,662,805 B2
(45) Date of Patent: Mar. 4, 2014

(54) TORQUE-LIMITED ATTACHMENT DEVICE

(75) Inventors: Marc Schaeffer, Feldkirch-Nofels (AT); Michael Selb, Feldkirch (AT); Mathias Goldt, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 28 days.

(21) Appl. No.: 13/369,713

(22) Filed: Feb. 9, 2012

(65) Prior Publication Data

US 2012/0207563 A1 Aug. 16, 2012

(30) Foreign Application Priority Data

Feb. 9, 2011 (DE) .......................... 10 2011 003 835

(51) Int. Cl.
*F16B 31/00* (2006.01)

(52) U.S. Cl.
USPC .......................... 411/3; 411/1; 411/2; 411/257

(58) Field of Classification Search
USPC .......... 411/1–3, 190, 204, 212, 214, 257, 258
See application file for complete search history.

(56) References Cited

U.S. PATENT DOCUMENTS

| | | | | |
|---|---|---|---|---|
| 3,099,083 | A | * | 7/1963 | De Long .......................... 29/458 |
| 3,174,385 | A | * | 3/1965 | Hallowell, Jr. ..................... 411/2 |
| 3,370,341 | A | * | 2/1968 | Allsop ............................ 29/413 |
| 3,444,775 | A | * | 5/1969 | Hills .............................. 411/5 |
| 3,573,111 | A | * | 3/1971 | Thurston ....................... 428/328 |
| 3,742,583 | A | | 7/1973 | Devlin et al. |
| 4,003,760 | A | * | 1/1977 | Labenski et al. .............. 148/265 |
| 4,037,515 | A | * | 7/1977 | Kesselman ........................ 411/3 |
| 4,046,052 | A | * | 9/1977 | Nordstrom ........................ 411/1 |
| 4,074,011 | A | * | 2/1978 | Teramae et al. ............... 428/422 |
| 4,114,505 | A | * | 9/1978 | Loeser et al. .............. 427/388.4 |
| 4,836,727 | A | | 6/1989 | Volkmann |
| 5,658,017 | A | * | 8/1997 | Chirehdast et al. ............... 285/4 |
| 6,179,841 | B1 | * | 1/2001 | Jackson ........................ 606/301 |

(Continued)

FOREIGN PATENT DOCUMENTS

| | | |
|---|---|---|
| DE | 1800574 A1 | 10/1969 |
| DE | 3807918 A1 | 9/1989 |
| GB | 684821 | 12/1952 |
| GB | 1411151 A | 10/1975 |

OTHER PUBLICATIONS

EP Communication, Jun. 6, 2012 in Application No. 12150707.3 (7 pages).

(Continued)

*Primary Examiner* — Roberta Delisle
(74) *Attorney, Agent, or Firm* — McAndrews, Held & Malloy, Ltd.

(57) ABSTRACT

One or more embodiments of the present invention relate to a torque-limited attachment device, having a first head piece with at least one shaped element for the purpose of establishing a positive-fit connection to an attachment tool, and having a second head piece which has at least one threading, wherein both head pieces are connected to each other, forming at least one predetermined breaking point which breaks at a limit torque between the two head pieces such that a first breakaway surface, the same being functionally assigned to the first head piece, and a second breakaway surface, the same being functionally assigned to the second head piece, are created, and wherein at least the second head piece has a base material inside, the same having a corrosion-resistant surface coating.

14 Claims, 1 Drawing Sheet

(56) References Cited

U.S. PATENT DOCUMENTS

| | | |
|---|---|---|
| 6,604,882 B2 * | 8/2003 | Gordon et al. ............... 403/2 |
| 2002/0076295 A1 | 6/2002 | Gibbons |
| 2003/0198528 A1 * | 10/2003 | Onishi et al. ............... 411/2 |
| 2004/0136801 A1 * | 7/2004 | Schneider et al. ........... 411/3 |
| 2008/0014042 A1 * | 1/2008 | De France ................... 411/2 |

OTHER PUBLICATIONS

German Patent Office, official action in application No. 102011003835.3 mailed Feb. 16, 2012.

* cited by examiner

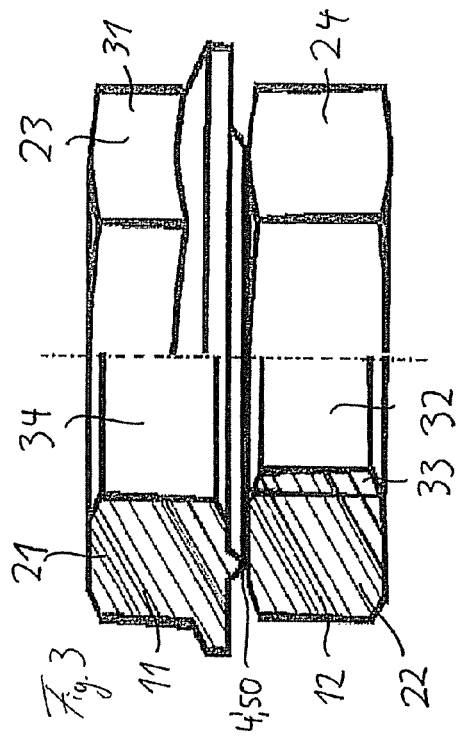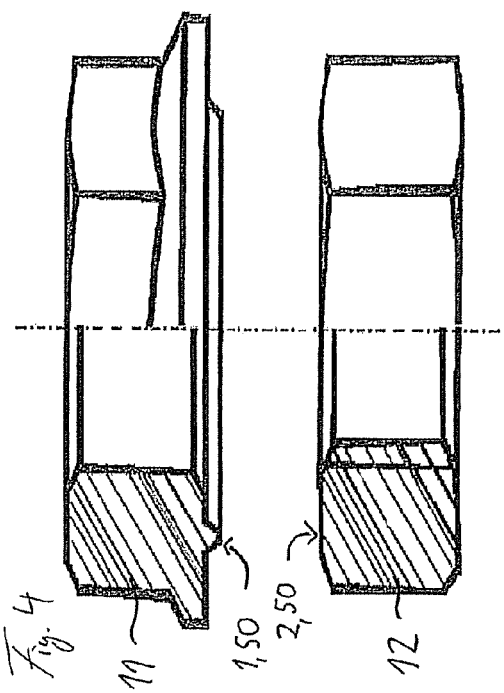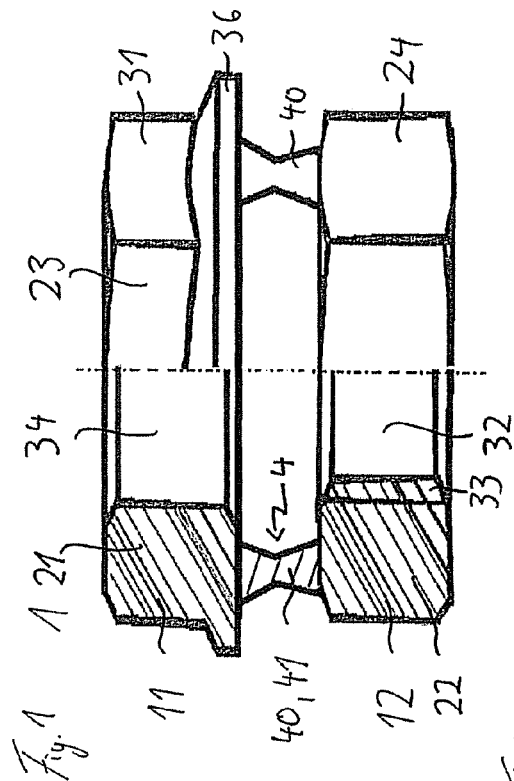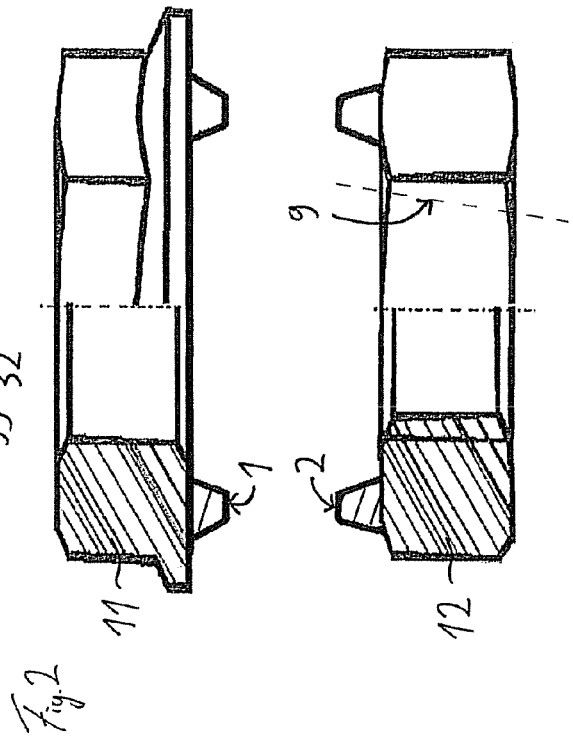

TORQUE-LIMITED ATTACHMENT DEVICE

CROSS-REFERENCE TO RELATED APPLICATIONS

The present application claims priority to German Patent Application DE 10 2011 003 835. 3, filed Feb. 9, 2011, and entitled "Drehmomentbegrenzte Befestigungsvorrichtung" ("Torque-Limited Attachment Device"), the entire content of which is incorporated herein by reference.

BACKGROUND OF THE INVENTION

One or more embodiments of the invention relate to a torque-limited attachment device, having a first head piece with at least one shaped element for the purpose of establishing a positive-fit connection to an attachment tool, and a second head piece which has at least one threading, wherein both head pieces are connected to each other, forming a predetermined breaking point which breaks at a limit torque between the two head pieces such that a first breakaway surface, the same being functionally assigned to the first head piece, and a second breakaway surface, the same being functionally assigned to the second head piece, are created, and wherein at least the second head piece and preferably the first head piece have a base material inside which has a corrosion-resistant surface coating.

Breakaway nuts or breakaway bolts having two heads are known, the same being connected to each other via a welded connection. When these nuts and/or bolts are affixed, a torque is applied to the first head piece by means of an attachment tool, wherein the torque is transferred via a connection to the second head piece at the beginning of the attachment process. When a prespecified limit torque is reached at the end of the attachment process, the first head piece shears off from the second head piece at the connection. The maximum torque applied to the second head piece is limited by this shearing.

For example, US 2002/076295 A1 discloses a breakaway nut. A breakaway bolt is known from GB1411151A.

For reasons of cost, breakaway nuts are frequently produced from a base material which is comparatively susceptible to corrosion. This base material is protected from corrosion by means of a treatment of the surface thereof. However, observations have shown that corrosion problems can occur during the use of such breakaway nuts in certain circumstances despite this surface treatment.

BRIEF SUMMARY OF THE INVENTION

The problem addressed by one or more embodiments of the invention is that of providing a torque-limited attachment device which is both cost-effective to manufacture and also particularly resistant to corrosion.

The problem is addressed by the features of the independent claim. Advantageous implementations of one or more embodiments of the invention are given in the dependent claims.

BRIEF DESCRIPTION OF THE DRAWINGS

One or more embodiments of the invention are described in greater detail below with reference to preferred embodiments thereof, the latter being illustrated schematically in the attached figures, wherein:

FIG. 1 shows a first embodiment of a torque-limited attachment device prior to the limit torque being reached, with a side perspective shown on the right and a cutaway perspective shown on the left;

FIG. 2 shows the attachment device in FIG. 1 after the limit torque is reached;

FIG. 3 shows a second embodiment of a torque-limited attachment device prior to the limit torque being reached, with a side perspective shown on the right and a cutaway perspective shown on the left;

FIG. 4 shows the attachment device in FIG. 3 after the limit torque is reached;

Elements having the same function are given the same reference numbers in the figures.

DETAILED DESCRIPTION OF THE INVENTION

The device according to one or more embodiments of the invention is characterized in that at least the second breakaway surface, the same being functionally assigned to the second head piece, has a higher resistance to corrosion than an uncoated surface of the base material of the second head piece.

One or more embodiments of the invention are based on the realization that the problems of corrosion observed in the prior art can be attributed to the breakaway surfaces which are created when the two head pieces shear off at the predetermined breaking point. Because these breakaway surfaces are only exposed once the device is used as specified, namely once the limit torque is reached and the device breaks at the predetermined breaking point, any corrosion protection applied at the breakaway site during manufacture of the device will have no effect. As such, in the prior art, gaps in the corrosion protection can occur at the breakaway surfaces. The breakaway surfaces can then form a point of initiation for corrosion, wherein said corrosion can penetrate the base material of the head pieces starting at that point, and over time can spread to regions which are adjacent to the breakaway surfaces and are only protected superficially.

One or more embodiments of invention proceed from this configuration. According to one or more embodiments of the invention, the material used in the region of the predetermined breaking point is modified in such a manner that the breakaway surfaces which appear upon breaking of the device at the predetermined breaking point have a higher resistance to corrosion than the naked base material of the head piece. As such, the breakaway surfaces likewise have a corrosion-inhibiting effect, such that now, according to one or more embodiments of the invention, the device comprises continuous corrosion protection with no gaps following breakage at the predetermined breaking point. As such, according to one or more embodiments of the invention, a particularly corrosion resistant component is obtained which is also simultaneously especially cost-effective. This is because the corrosion resistance itself is achieved by means of the composition of the regions near the surface. As a result, a comparatively cost-effective material can still be used as the base material for the head pieces, wherein the same is comparatively susceptible to corrosion.

In other words, one or more embodiments of the invention can be seen to be based on the fundamental idea of selecting the material composition of the attachment device in such a manner that a break at the predetermined breaking point exposes a breakaway surface, at least on the second head piece, which has a higher resistance to corrosion than a theoretical break would have, wherein said theoretical break would run through the base material of the second head piece. As such, the second breakaway surface created at the predetermined breaking point functions as corrosion protection for the base material of the second head piece.

As a rule, the second head piece, the same comprising the threading, has a load-bearing function following placement of the attachment device. In contrast, the first head piece only serves a function during the placement of the device, and is lost following this placement. For this reason, over the long term, the corrosion resistance of the second head piece is particularly relevant as a rule. However, in the event that the corrosion resistance of the first head piece is important, one or more embodiments of the invention can also provide a configuration wherein the first breakaway surface which is functionally assigned to the first head piece has a higher resistance to corrosion than an uncoated surface of the base material of the first head piece. For the purpose of simplifying the manufacture thereof, both head pieces include advantageously of the same base material.

According to one or more embodiments of the invention, the term "base material: can be understood to mean the material which is located in the interior, i.e. in the core, of the device. If a surface coating in present, the base material and the surface material are different. The base material and the surface material can also be identical in a further configuration.

The device according to one or more embodiments of the invention and/or the head pieces thereof can comprise a metal material, particularly steel. According to one or more embodiments of the invention, the term "corrosion resistance" can be particularly understood to mean the pitting resistance (pitting resistance equivalent, PRE). This is given as:

PRE=% Cr+3.3% Mo+30% N, wherein % Cr, % Mo, and % N are the percentages of chromium, molybdenum, and nitrogen by weight. As such, a surfacing having higher corrosion resistance can have higher pitting resistance. For the purpose of providing higher corrosion resistance, stainless steel or zinc can be used.

One or more embodiments of the invention also relate to the use of a device according to one or more embodiments of the invention in an environment which is corrosive for the device, for example in the atmosphere. The term "corrosion resistance" can include the corrosion resistance with respect to the corrosive environment. The term "corrosion resistance" can particularly be understood to mean resistance with respect to acid corrosion.

The corrosion-inhibiting surface coating of the second and/or the first head piece can particularly be a layer of zinc or of paint.

In one preferred embodiment of the invention, both of the head pieces are connected to each other via at least one connector part, and the predetermined breaking point is a structural design component of said connector part. In addition, the connector part has a base material which is more corrosion resistant than the second head piece, and also particularly more corrosion resistant than the first head piece. Particularly, in this embodiment, the increased level of corrosion resistance at the breakaway surfaces of the predetermined breaking point is achieved not by modifications to the surface, but rather by local variation of the composition of the base material lying beneath the surface. As such, this embodiment involves a configuration wherein the connector part has a different base material from the first and/or the second head piece. The connector part can be connected to the head piece in a material connection, e.g. by welding. By way of example, the connector part can comprise stainless steel for the purpose of increasing the corrosion resistance thereof.

As an alternative or in addition thereto, both head pieces can be connected to each other in a material connection by means of at least one additional material, wherein the predetermined breaking point is a structural design component of the additional material. If the material connection is a soldered connection, the additional material can be a soldering material. If the material connection is a glued connection, the additional material can be a glue. In this embodiment, the increased resistance to corrosion at the predetermined breaking point can be particularly realized by means of surface effects. By way of example, the additional material can effect protection against corrosion on the breakaway surfaces created upon breaking of the predetermined breaking point, i.e. upon breaking of the material connection, and can also function as the material connection itself.

The predetermined breaking point can particularly be formed as a result of the connector part and/or the additional material having lower strength and/or expansion with respect to the environment.

By way of example, the torque-limited attachment device can be designed as a breakaway nut, and the threading on the second head piece can be an inner threading. However, the torque-limited attachment device can also be designed as a breakaway bolt, wherein the threading on the second head piece is then an outer threading.

The shaped element serves the purpose of creating a torque-proof positive-fit connection to the attachment tool, wherein torque applied by the attachment tool can be transmitted to the first head piece via said positive-fit connection. The shaped element can, for example, be a multi-sided shape situated on the outside or inside, particularly a hexagon. However, the shaped element can also be a slot, by way of example, particularly a crossed slot.

A first embodiment of a torque-limited attachment device is illustrated in FIGS. 1 and 2, wherein the same is designed as a breakaway nut, and wherein FIG. 1 shows the torque-limited attachment device prior to the limit torque being reached, and FIG. 2 shows the same after the limit torque is reached and both head pieces have sheared off.

The device illustrated in FIG. 1 has a first head piece 11. A shaped element 31 is a structural design component of said head piece, and has a polygonal, and particularly hexagonal shape arranged on the outer side thereof. The shaped element 31 is formed for the purpose of allowing a turning tool, the same being not illustrated in the figure, to engage in the shaped element 31. In addition, the device has a second head piece 12 with a bore hole 32 which passes entirely through the head piece 12, said bore hole 32 having an inner threading 33. The first head piece 11 likewise has a bore hole 34 which passes entirely through the same and which aligns with the bore hole 32. However, the inner diameter of the bore hole 34 is larger than that of the inner threading 33 of the second head piece 12. In this way, a threaded rod which corresponds to the inner threading 33 of the second head piece 12 can pass freely through the bore hole 34 in the first head piece 11. The outer side of the first head piece 11 has a collar 36 which projects beyond the outer side of the first head piece 11 radially. This collar 36 prevents the attachment tool which engages with the first head piece 11 from engaging with the second head piece 12.

Both head pieces 11 and 12 include of a core which is made of a base material 21 and/or 22, wherein the latter is relatively highly susceptible to corrosion, and is for instance unalloyed steel. In order to ensure the necessary resistance to corrosion, the base materials each have a surface coating 23 and/or 24.

In the embodiment shown in FIGS. 1 and 2, both head pieces 11 and 12 are initially (see FIG. 1) connected via connection points 40. The connection points can be welded or glued, for example, to each of the head pieces 11 and 12. The connector parts 40 each have a predetermined breaking point 4, wherein the same is illustrated in an exemplary manner as a narrowing of the connector parts 40. If the torque between the two head pieces 11 and 12, said torque being applied by the turning tool, reaches a limit torque, the predetermined breaking point 4 fails in its connection and the two head pieces 11 and 12 become separated from each other (see FIG. 2). As a result, corresponding breakaway surfaces 1 and 2 are created on the connector part 40, wherein the first breakaway surface 1 is functionally assigned to the first head piece 11, and the second breakaway surface 2 is functionally assigned to the second head piece 12.

The breakaway surfaces 1 and 2 created upon the breaking of the connector parts 40 at the predetermined breaking point 4 are formed by the base material 41 of the connector parts 40. This base material 41 becomes exposed upon the breaking of the connector parts 40. According to one or more embodiments of the invention, this base material 41 is made of a material which is more resistant to corrosion than the base material 21, 22 of each head piece 11, 12. By way of example, the base material 41 of the connector parts 40 can be stainless steel. Due to the increased resistance to corrosion of the base material 41 of the connector parts 40, the breakaway surfaces 1 and 2 in the breaking area, the same being created upon the breaking of the connector parts 40, form a surface which protects against corrosion for both head pieces 11, 12. While protection against corrosion is provided, by means of the surface coatings 23 and/or 24 thereof, for the regions of the head pieces 11, 12 which lie outside the breaking area, corrosion protection is provided in the breaking area, wherein no surface coatings 23 and/or 24 are present in this area, by means of the increased resistance to corrosion of the base material 41 of the connector part 40.

Because the connection points 40 comprise a more corrosion resistant base material 41 than the second head piece 12, the breakaway surfaces 2 of the second head piece 12 which are created on the connector parts 40 are more resistant to corrosion than a theoretical breakaway surface which would otherwise be created by a break 9 which runs through the second head piece 22.

A further embodiment of the invention is illustrated in FIGS. 3 and 4. FIG. 3 shows the configuration thereof prior to the limit torque being reached, and FIG. 4 shows the same after the limit torque is reached and both head pieces shear off. The embodiment in FIGS. 3 and 4 differs from the embodiment in FIGS. 1 and 2 in that, according to FIGS. 3 and 4, no connector part, the same being made of a different material, is present. Rather, both head pieces 11 and 12 are joined directly to each other by means of an additional material 50, for example a glue or a soldering compound, with no space between. The predetermined breaking point 4' is formed on the corresponding joint.

After the predetermined breaking point 4' is broken, upon the limit torque being reached (see FIG. 4), the additional material 50 adheres to the breakaway surfaces 1 and 2 created at that position, thereby providing protection against corrosion for the base material 21 and/or 22 of the head pieces 11 and 12. By way of example, the additional material can be zinc and/or a resin.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A torque-limited attachment device having:
    a first head piece which has at least one shaped element for the purpose of establishing a positive-fit connection to an attachment tool, and
    a second head piece which has at least one threading,
    wherein both head pieces are connected to each other, forming a predetermined breaking point which breaks between the two head pieces at a limit torque, such that a first breakaway surface functionally assigned to the first head piece and a second breakaway surface functionally assigned to the second head piece are formed,
    wherein at least the second head piece has a base material inside which has a corrosion-resistant surface coating,
    wherein at least the second breakaway surface functionally assigned to the second head piece has a higher resistance to corrosion than an uncoated surface of the base material of the second head piece.

2. A device according to claim 1, wherein both head pieces are connected to each other via at least one connector part, wherein a predetermined breaking point is part of the same, and in that the connector part has a base material with a higher resistance to corrosion than the second head piece.

3. A device according to claim 2, wherein the device is designed as a breakaway nut, and in that the threading on the second head piece is an inner threading.

4. A device according to claim 3, wherein the shaped element is a polygon arranged on the outer side.

5. A device according to claim 2, wherein the shaped element is a polygon arranged on the outer side.

6. A device according to claim 1, wherein both head pieces are connected to each other in a material connection using at least one additional material, wherein the predetermined breaking point is part of the additional material.

7. A device according to claim 6, wherein the device is designed as a breakaway nut, and in that the threading on the second head piece is an inner threading.

8. A device according to claim 7, wherein the shaped element is a polygon arranged on the outer side.

9. A device according to claim 6, wherein the shaped element is a polygon arranged on the outer side.

10. A device according to claim 1, wherein the device is designed as a breakaway nut, and in that the threading on the second head piece is an inner threading.

11. A device according to claim 10, wherein the shaped element is a polygon arranged on the outer side.

12. A device according to claim 1, wherein the shaped element is a polygon arranged on the outer side.

13. A torque-limited attachment device having:
    a first head piece which has at least one shaped element for the purpose of establishing a positive-fit connection to an attachment tool;
    a second head piece which has at least one threading, the second head piece being formed of a base material that is coated with a corrosion resistant coating; and
    a connector piece interconnecting the first and second head pieces, the connector piece being formed of a material having a higher resistance to corrosion than the base material of the second head piece, the connector piece forming a predetermined breaking point which breaks between the two head pieces at a predetermined torque, such that connector piece breaks into at least a breakaway surface functionally assigned to the second head piece.

14. A torque-limited attachment device having:
- a first head piece which has at least one shaped element for the purpose of establishing a positive-fit connection to an attachment tool; and
- a second head piece which has at least one threading;
- wherein at least the second head piece has a base material coated with a corrosion-resistant surface coating; and
- wherein the head pieces are connected to each using at least one additional material which has a higher resistance to corrosion than the base material of the second head piece, wherein the additional material defines a predetermined breaking point which breaks between the two head pieces at a predetermined torque.

* * * * *